(12) United States Patent
Wang et al.

(10) Patent No.: US 11,844,162 B2
(45) Date of Patent: Dec. 12, 2023

(54) INITIALIZATION METHOD OF HUMAN-FACTOR LAMPS CAPABLE OF INTELLIGENTLY ADJUSTING AMBIENT LIGHT

(71) Applicants: GENERAL LUMINAIRE (SHANGHAI) CO., LTD., Shanghai (CN); GENERAL LUMINAIRE (KUNSHAN) CO., LTD., Kunshan (CN); GENERAL LUMINAIRE CO., LTD., New Taipei (TW)

(72) Inventors: Yung-Hong Wang, Shanghai (CN); Chien Lee, Shanghai (CN)

(*) Notice: Subject to any disclaimer, the term of this patent is extended or adjusted under 35 U.S.C. 154(b) by 196 days.

(21) Appl. No.: 17/582,009

(22) Filed: Jan. 24, 2022

(65) Prior Publication Data
US 2023/0239983 A1   Jul. 27, 2023

(51) Int. Cl.
| H05B 47/11 | (2020.01) |
| H05B 47/115 | (2020.01) |
| H05B 47/135 | (2020.01) |
| H05B 47/19 | (2020.01) |
| H05B 47/155 | (2020.01) |

(52) U.S. Cl.
CPC ........... *H05B 47/11* (2020.01); *H05B 47/115* (2020.01); *H05B 47/135* (2020.01); *H05B 47/155* (2020.01); *H05B 47/19* (2020.01)

(58) Field of Classification Search
None
See application file for complete search history.

(56) References Cited

U.S. PATENT DOCUMENTS

| 8,872,432 | B2 | 10/2014 | Kercso et al. | |
| 9,807,857 | B2 | 10/2017 | Huang | |
| 2015/0035440 | A1* | 2/2015 | Spero | B60Q 1/1423 315/153 |
| 2017/0171941 | A1* | 6/2017 | Steiner | H04N 7/188 |
| 2018/0143321 | A1* | 5/2018 | Skowronek | G01S 17/66 |
| 2021/0029789 | A1* | 1/2021 | Ganick | G06N 3/08 |
| 2022/0170320 | A1* | 6/2022 | Casey | G06T 7/0002 |

\* cited by examiner

*Primary Examiner* — Wilson Lee

(57) ABSTRACT

In an initialization method of human-factor lamps capable of intelligently adjusting ambient light, the human-factor lamps are installed in a factory, and Beacon host systems are set up in the factory, and the light emitting devices have the Bluetooth function. A specialist can perform an initialization of the human-factor lamps by a mobile phone with a Bluetooth transmission function, and the mobile phone is loaded with pre-set factory lighting chart information, and the factory lighting chart information includes the pre-set identity codes corresponding to the light emitting devices, and the factory lighting chart information can be corrected through the mobile phone and matched with the factory. The specialist can use the indoor positioning function of the Beacon host systems to move to the corresponding positions of the light emitting devices sequentially and write the identity codes of the light emitting devices automatically and sequentially to complete the initialization.

5 Claims, 10 Drawing Sheets

INITIALIZATION METHOD OF HUMAN-FACTOR LAMPS CAPABLE OF INTELLIGENTLY ADJUSTING AMBIENT LIGHT

BACKGROUND

Technical Field

The present disclosure relates to the field of lighting, and more particularly to an initialization method of human-factor lamps capable of intelligently adjusting ambient light, and the method detects the position and movement of a person to change the overall luminous performance accordingly.

Description of Related Art

The main purpose of lighting design is to provide appropriate light in a space for users to engage in various visual activities, so that the lighting design of these activities needs to be adjusted according to the activities. For large indoor environments such as factories or warehouses, common systems are equipped with a large number of lamps with a consistent lighting condition. Due to special purposes, some large indoor environments even require 24 hours of uninterrupted lighting. However, the traditional lamps are unable to achieve the effect of human factors in lighting. In other words, the traditional lamps cannot adjust the lighting effectively when there are no people around, thus resulting in unnecessary energy consumption. In some conventional technologies, sensors are provided to sense the entry and exit of people, wherein the lamps are usually turned off, and they are turned on only when there are people around. In addition, the lamps will be turned off automatically after being turned on for a certain period of time, and thus can achieve the effect of energy saving. On the other hand, there is another technical method capable of automatically turning on the lighting equipment when the brightness of ambient light is insufficient.

However, these conventional technologies just provide the method of turning on the lighting equipment after a sensing condition is triggered, and the ON and OFF adjustments of the lamps can be made independently or a central control system is required for consistent modulation. So far, there is no lighting device capable of synchronously adjusting all lamps according to the movement of people in the whole environment, producing a differential lighting effect for each lamp, and overcoming the aforementioned drawbacks of the prior art including the additional network setup cost, unnecessary energy consumption and difficult control of the conventional lamps that use the central control system. As disclosed in U.S. Pat. No. 9,807,857B2 entitled "ILLUMINATION CONTROL SYSTEM", a mobile device is used as a positioning tool and linked with a lamp, and a positioning system is provided for detecting the position of a person and driving the operation of a lamp near such position. In addition, U.S. Pat. No. 8,872,432 B2 entitled "SOLUTION FOR DYNAMIC LIGHTING CONTROL" provides a plurality of sensors with different detection ranges on an independent lamp for sensing the distance from the position of a person in order to adjust the luminous intensity. In other words, these technologies just provide a technical measure for sensing and controlling independent lamps only, but there is no technical measure for the mutual communication between the lamps, so that after the lamps communicate with each other, all of the lamps are adjusted fixedly by a linkage operation for the lighting effect.

The discloser of the present disclosure overcomes the drawbacks of the conventional lamp by providing a "HUMAN-FACTOR LAMP CAPABLE OF INTELLIGENTLY ADJUSTING AMBIENT LIGHT AND SYSTEM THEREOF" as disclosed in U.S. patent application Ser. No. 17/471,188, and such human-factor lamp is capable of providing human-factor lighting after the lamp is communicated with other lamps with regard to the movement of people and using the differential lighting intensity as the overall modulation to provide a body feeling more in line with the perception of lighting through human eyes, as well as saving energy and reducing overall control costs. In addition, the human-factor lighting system has a very good effect, but the main control method is to write in a corresponding identity code for each lamp and an overall relationship list between all lamps, so that each lamp can sense the entry and exit of people in the future, and the system can reflect different lighting statuses according to the identity codes and the overall relationship list. At present, each lamp is written with its corresponding relationship list and identity code during initialization in advance before the installation, and then the installer moves the lamps and installs them to corresponding positions according to instructions. Since the attributes of each installed lamp are unique, therefore if the actual installation space is complicated or the quantity of lamps is large, a wrong position configuration may be resulted from the difficulty of installation. Obviously, the initialization of the human-factor lighting system for correct operations needs further improvements.

In view of the aforementioned drawbacks of the prior art, the discloser of the present disclosure based on the U.S. patent application Ser. No. 17/471,188 to further provide an initialization method of human-factor lamps capable of intelligently adjusting ambient light in accordance with this disclosure to allow the installer to install the lamps flexibly in an environment, and then another specialist can write in the corresponding identity codes one by one for the lamps to substitute the conventional "setting up first and then installing later" method, so as to avoid the drawbacks and wrong position configuration resulted from the installation by the conventional method.

SUMMARY

Therefore, it is a primary objective of the present disclosure to provide an initialization method of the human-factor lamps that can be adapted to the corresponding field and can reduce the installation costs. Unlike the conventional lamps which are lighting systems unable to adjust the overall lighting performance and using a central control system for the control, the human-factor lamps are adjusted automatically and comprehensively by human detection. The human-factor lighting uses the characteristic of human eye's light perception, such as brightness constancy and other phenomena to design the lamps that can adjust the overall lighting in an environment according to the movement and position of people, and the adjusted lamps will not cause visual conflict or discomfort to human eyes. Especially for the application where lighting must be maintained 24 hours a day, this disclosure can further achieve the energy saving effect and eliminate the psychological pressure such as panic caused by a too-large area in human visual experience, and the initialization method of this disclosure can carry out the installation procedure more convenient and correctly.

To achieve the aforementioned objective, the present disclosure provides an initialization method of human-factor lamps capable of intelligently adjusting ambient light, wherein the human-factor lamps include a plurality of light emitting devices, and each of the light emitting devices includes a control processor, and a dimming unit, an identification unit, a detection unit, a transmitting unit, and a receiving unit are electrically connected to the control processor respectively, wherein the identification unit stores an identity code and a relationship list, and the identity code serves as a serial number identification of the light emitting device, and the relationship list stores the identity codes of all light emitting devices and pre-sets a hierarchical relationship between each light emitting device and the light emitting devices other than itself; if the detection unit of one of the light emitting devices detects that there is a person below, the detection unit will notify the control processor to drive the dimming unit to perform a priority lighting value setting, and the detection unit will notify the control processor to drive the transmitting unit to perform a luminous broadcast to the light emitting devices with the identity code other than the identity code of the lighting emitting device detected that there is a person below in the relationship list; if the detection unit of one of the light emitting devices detects that there is no person below, the receiving unit will receive at least one of the luminous broadcast of the light emitting devices with the identity code other than the identity code of the light emitting device detected that there is no person below, and the receiving unit will notify the control processor to drive the dimming unit to perform a secondary lighting value setting according to the luminous broadcast; wherein a parameter of the secondary lighting value setting is determined according to the hierarchical relationship in the relationship list, and if the receiving unit simultaneously receives two or more luminous broadcasts, the secondary lighting value setting will set a parameter according to the top-priority hierarchical relationship in the relationship list, and the initialization method is characterized in that: the human-factor lamps are installed in a factory, and a plurality of Beacon host systems is arranged in the factory, and the light emitting devices have a Bluetooth transmission function, and a specialist performs an initialization of the human-factor lamps through a mobile phone with the Bluetooth transmission function, wherein the mobile phone has pre-loaded factory lighting chart information, and the factory lighting chart information includes information of the pre-set identity codes corresponding to the light emitting devices, and if the specialist moves in the factory and then stands at a real location, the specialist can turn on the mobile phone to access the factory lighting chart information and set a virtual location corresponding to the real location as a reference location, and then correct the factory lighting chart information matched with the factory according to the reference location, and the specialist can use an indoor positioning function of the Beacon host systems to move to the corresponding positions of the light emitting devices sequentially and finally use the mobile phone to write in the identity codes corresponding to the light emitting devices automatically and sequentially. The human-factor lighting does not have a central control system, but each light emitting device observes the position and movement of a person and then uses a pre-set interactive relationship between the light emitting devices to automatically adjust the light setting conditions. The use of the initialization method of the present disclosure can make the installation of the human-factor lamps more convenient and accurate.

In an embodiment, the Beacon host systems use an AoA/AoD technique to realize an indoor positioning function.

In the aforementioned embodiment, the identity code corresponding to each light emitting device uses an X-Y two-dimensional coordinate value as the serial number identification.

In the aforementioned embodiment, after the mobile phone automatically and sequentially writes in the identity codes corresponding to the light emitting devices, the light emitting devices will show a luminous change.

In the aforementioned embodiment, the luminous change refers to a blinking state.

In summation, the human-factor lighting of the present disclosure can reduce installation costs and provide a convenient installation, and the adjusted lamps will not cause visual conflict or discomfort to human eyes. Especially for the application where lighting must be maintained 24 hours a day, this disclosure can further achieve the energy saving effect and eliminate the psychological pressure such as panic caused by a too-large area in human visual experience, and the initialization method of this disclosure can carry out the installation procedure more convenient and correctly. After the initialization of each light emitting device, the light emitting devices have different identities, so that the installation procedure of the conventional "setting up first and then installing later" method is complicated and difficult. Therefore, the initialization method of the present disclosure replaces the "setting up first and then installing later" method by the "installing first and then setting up later" method to improve the installation efficiency and avoid the wrong position configuration derived from the installation by the conventional method.

DESCRIPTION OF THE EMBODIMENTS

This disclosure will now be described in more detail with reference to the accompanying drawings that show various embodiments of this disclosure.

Figure 1:
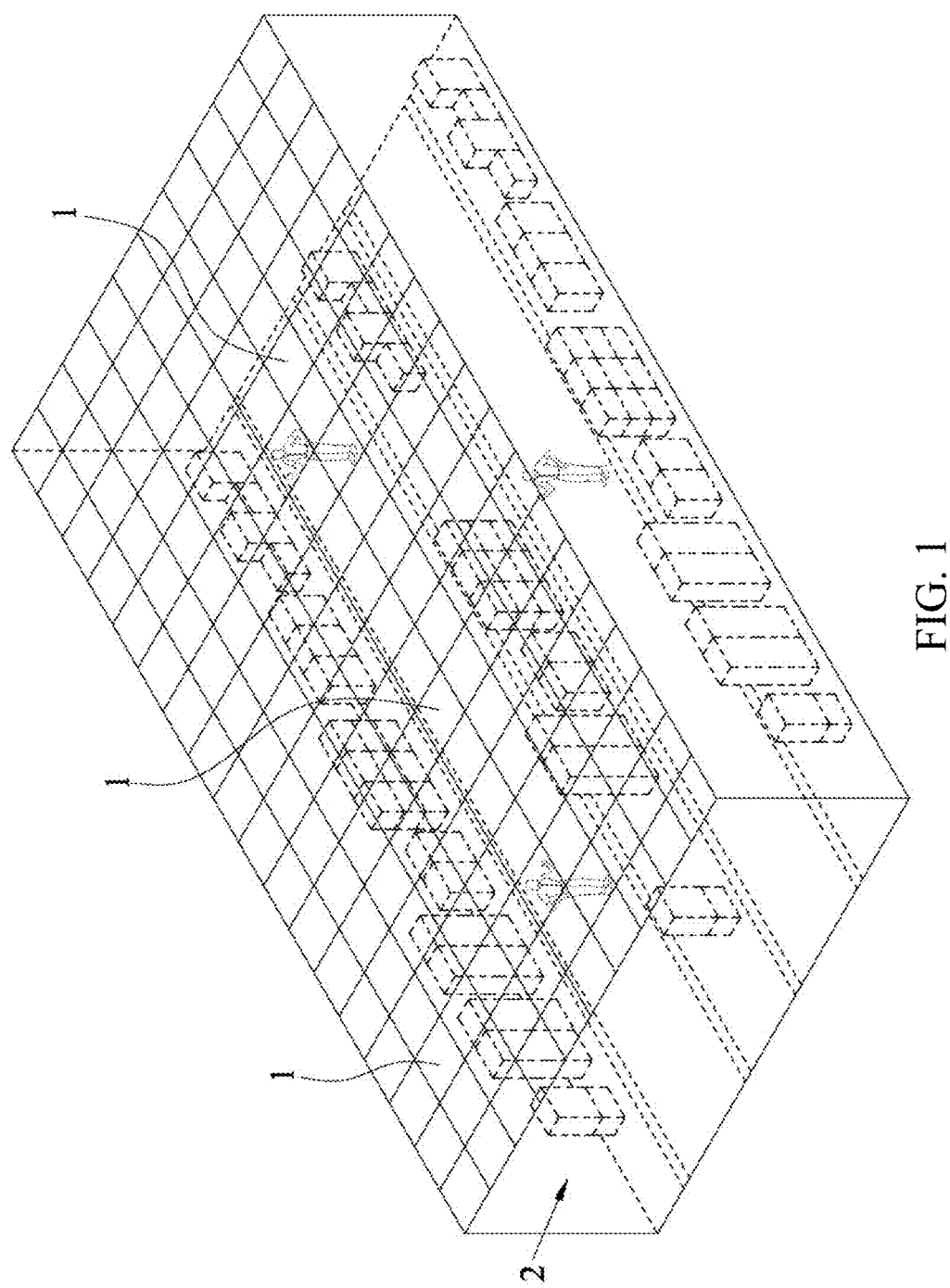
FIG. 1 is a schematic view of a human-factors lighting system installed in a factory environment in accordance with a preferred embodiment of this disclosure.
Figure 2:
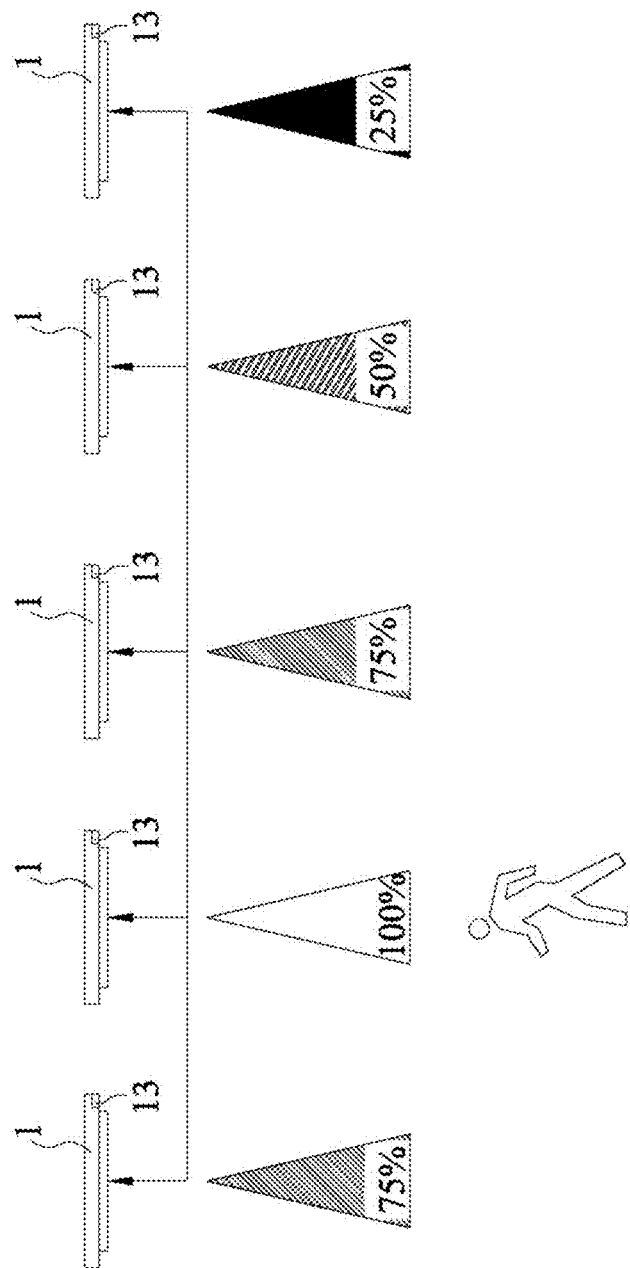
FIG. 2 is a first schematic view of modulating the lighting intensity of a human-factors lighting system in accordance with a preferred embodiment of this disclosure.
Figure 3:
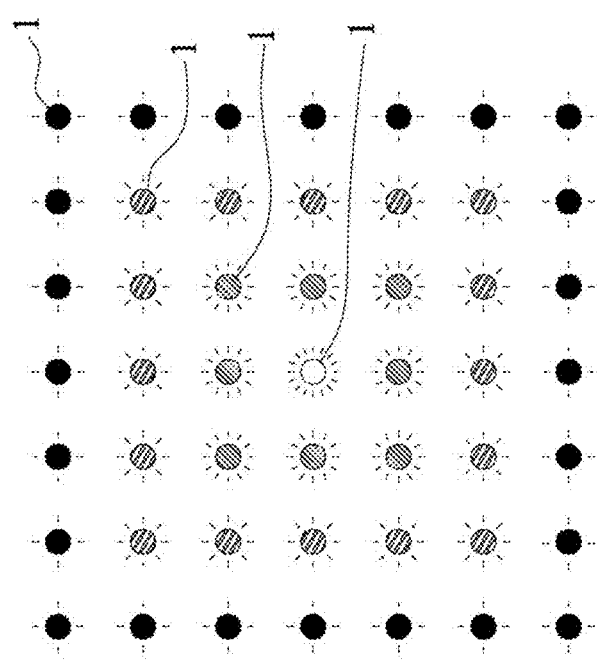
FIG. 3 is a second schematic view of modulating the lighting intensity of a human-factors lighting system in accordance with a preferred embodiment of this disclosure.
Figure 4:
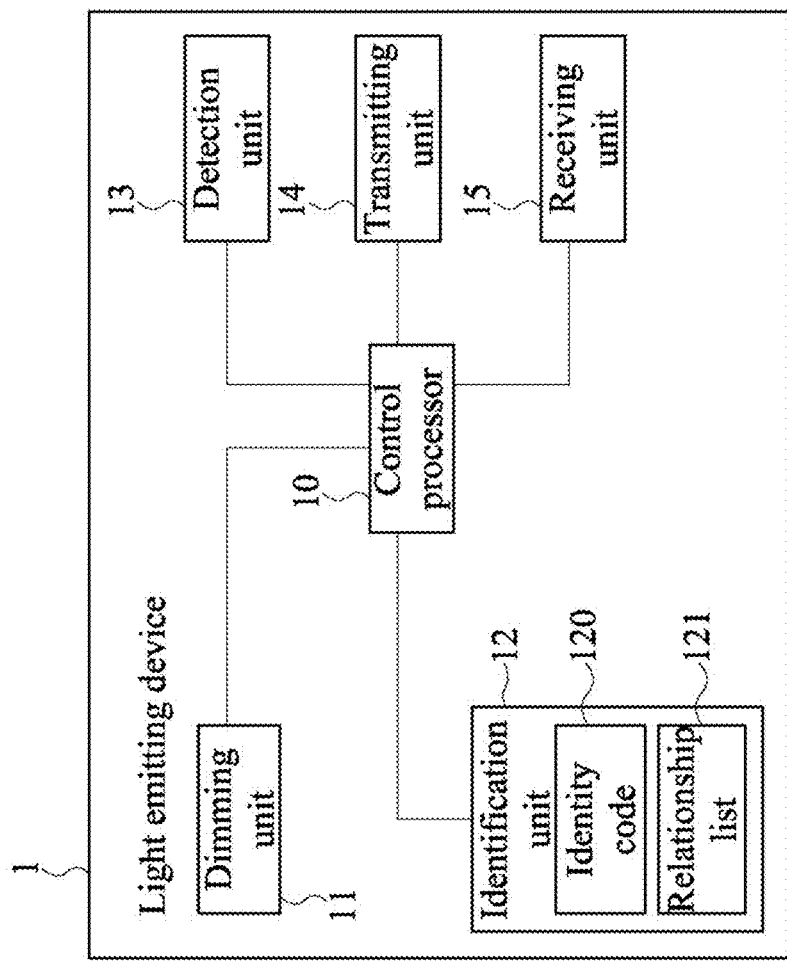
FIG. 4 is a functional block diagram of a human-factors lighting system in accordance with a preferred embodiment of this disclosure.
Figure 5:
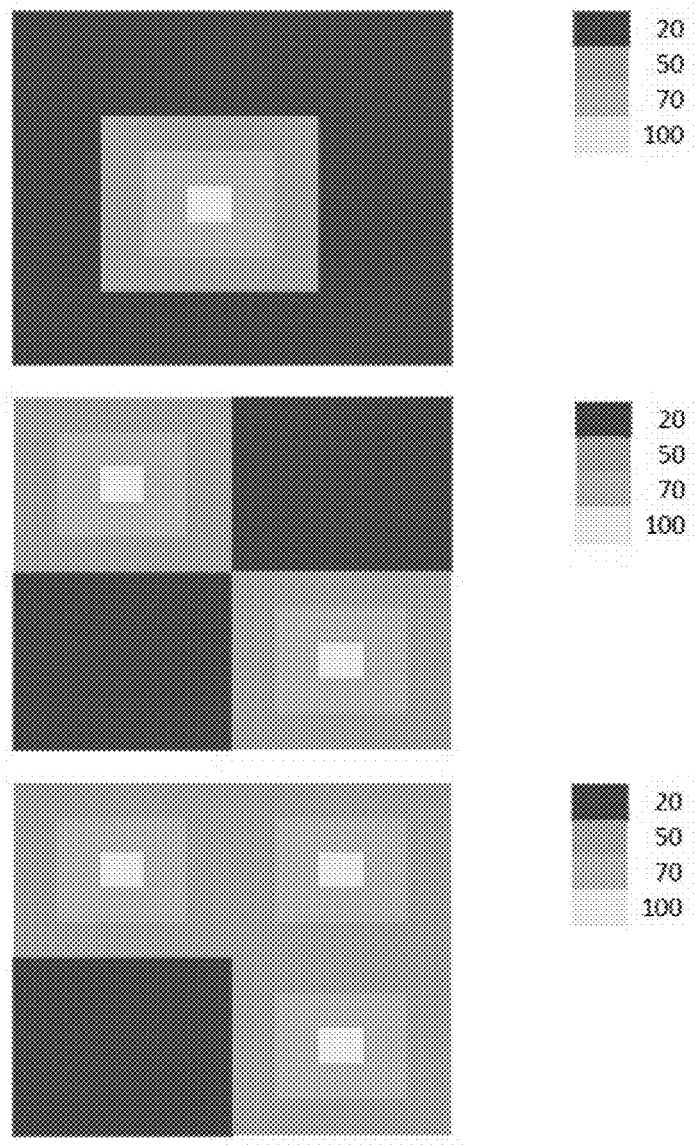
FIG. 5 is a first schematic view showing the overall operation of a human-factors lighting system in accordance with a preferred embodiment of this disclosure.
Figure 6:
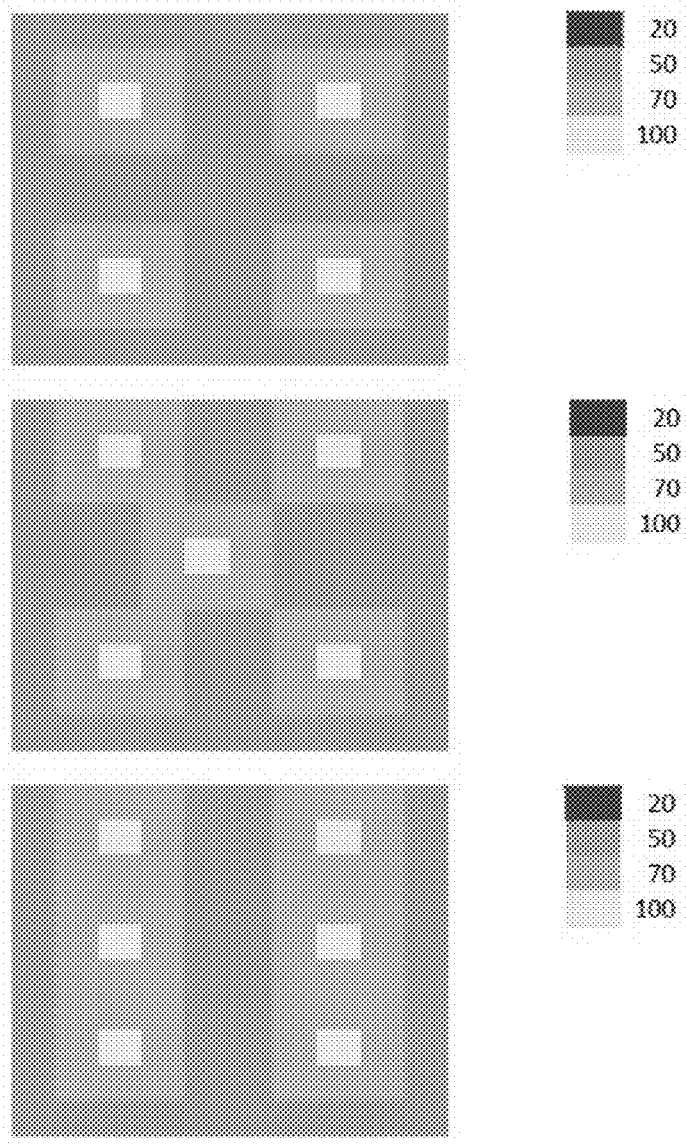
FIG. 6 is a second schematic view showing the overall operation of a human-factors lighting system in accordance with a preferred embodiment of this disclosure.
Figure 7:
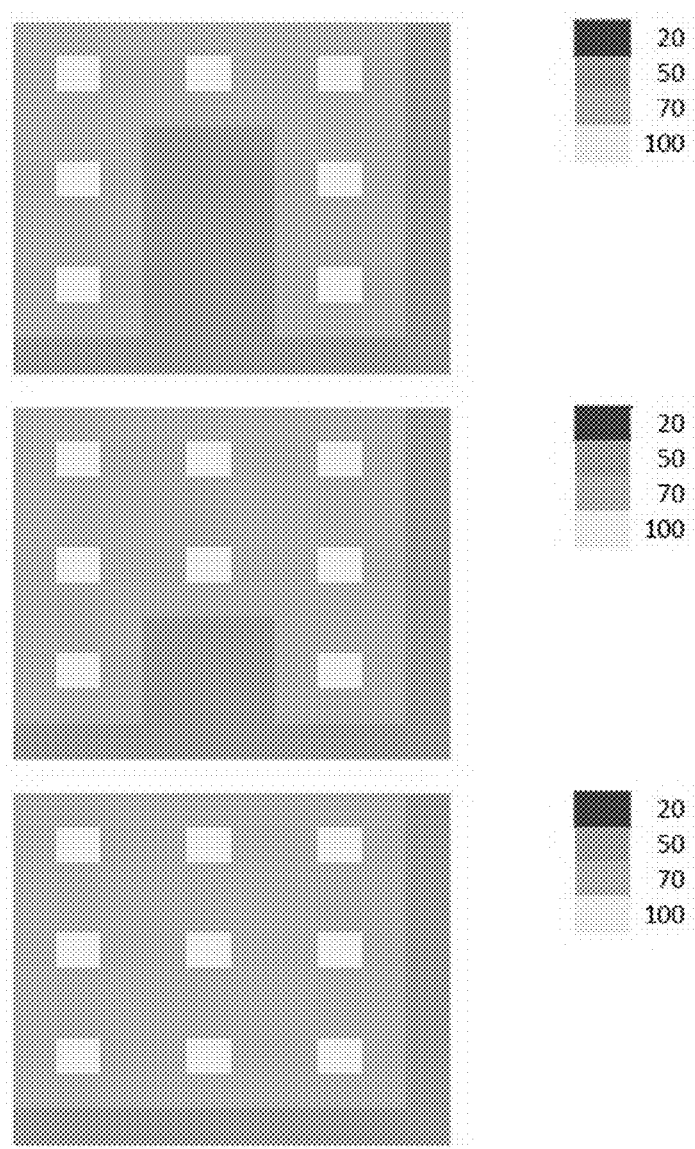
FIG. 7 is a third schematic view showing the overall operation of a human-factors lighting system in accordance with a preferred embodiment of this disclosure.
Figure 8:
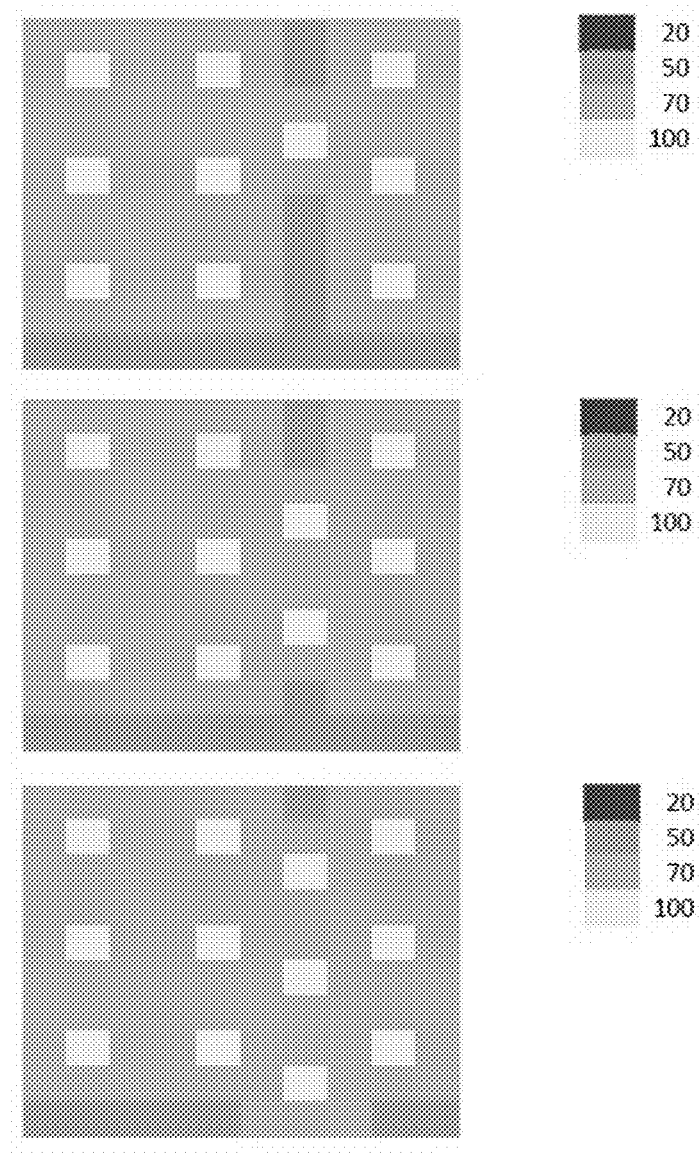
FIG. 8 is a fourth schematic view showing the overall operation of a human-factors lighting system in accordance with a preferred embodiment of this disclosure.
Figure 9:
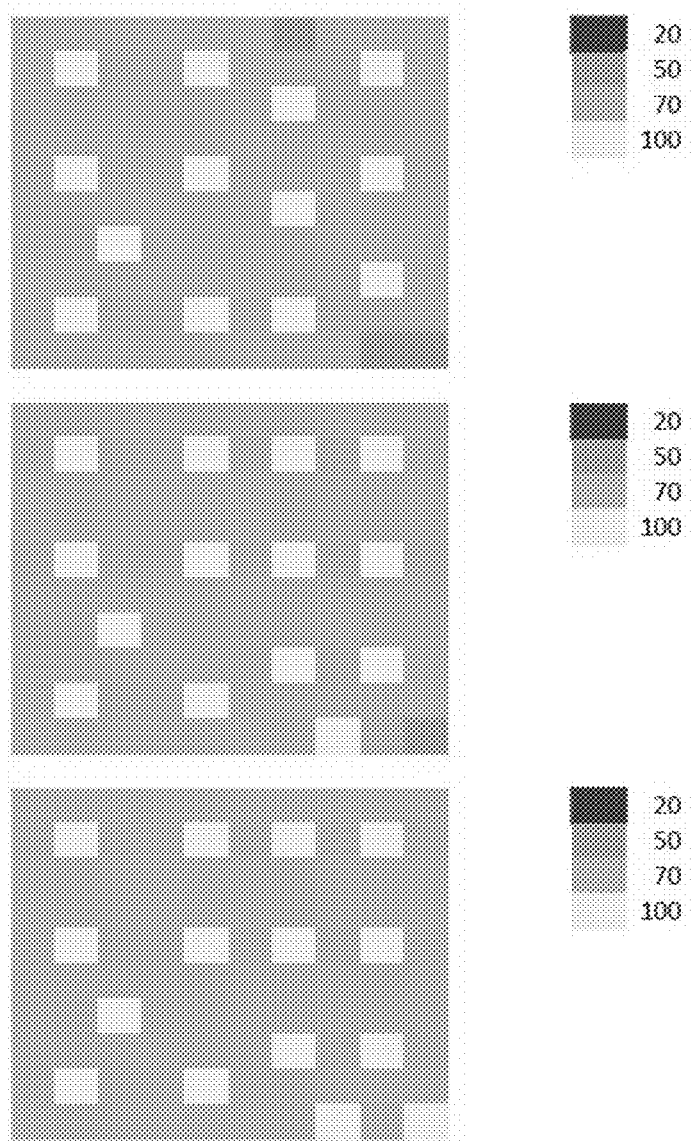
FIG. 9 is a fifth schematic view showing the overall operation of a human-factors lighting system in accordance with a preferred embodiment of this disclosure.

With reference to FIGS. 1, 2 and 3 for the schematic view of a human-factors lighting system installed in a factory environment and the first and second schematic views of modulating the lighting intensity of the human-factors lighting system in accordance with a preferred embodiment of this disclosure respectively, the human-factors lighting system includes a plurality of light emitting devices 1 sequentially installed and uniformly distributed on a ceiling of a factory 2. The factory 2 can accommodate workers and allow them to move or perform operations in the factory 2. For example, a large warehouse environment is an appropriate example. Since various types of the factory 2 usually have an environment with a large area, the traditional lighting mode is mostly set to turn on all lamps with a fixed brightness in the factory in order to avoid the burden and danger of work caused by the too-dark areas. However, this will cause unnecessary energy consumption, especially for the requirement of maintaining an uninterrupted lighting environment throughout the year, which creates a great burden on the energy supply. Therefore, this disclosure overcomes the drawbacks of the prior art by providing a human-factors lighting system having the light emitting devices 1 in accordance with this preferred embodiment to detect the position of workers and further adjust the overall brightness performance of the light emitting devices 1. Each of the light emitting devices 1 has a detection unit 13, and when the detection unit 13 of a light emitting device 1 detects that there is a person below, the light emitting device 1 is defined as a primary lamp, and all other light emitting devices 1 are defined as secondary lamps, wherein one or more light emitting devices 1 defined as the primary lamp are adjusted to a maximum luminous intensity, and the secondary lamps, which detect no person below, are adjusted sequentially from the position of the primary lamp position to the outside with a stepwise decremented luminous intensity to a minimum luminous intensity. While adjusting brightness, it is inevitable to have people around. As a result, when any one secondary lamp at this time is near two or more primary lamps of different distances, the secondary lamps are adjusted with the stepwise decremented luminous intensity and then a larger luminous intensity is preferably used as the basis for adjusting brightness. Preferably, the intensity ratio of the primary lamp to the secondary lamps adjusted with the stepwise decremented luminous intensity is designed with a multi-stage design according to the size of the factory environment and the distance between the ceiling and people. For example, this embodiment adopts the common intensity ratios such as 100%: 75%: 50%: 25% and 100%: 70%: 50%: 20% for four different intensities. In this way, this disclosure can effectively reduce unnecessary energy consumption while taking the public safety of the environment into account, so that the best lighting performance can be presented in the position of people, the discomfort and psychological pressure of the too-dark area will not be produced for the environment at a distance. Of course, based on user requirements and site conditions such as the quantity and size of equipment, the wall reflection conditions, and related factors, an appropriate adjustment can be made according to the following suggestions if the adjustment has a tendency of decreasing the brightness with increased distance. For example, the brightness of the light emitting device is decremented sequentially outward from the strongest 100% with equal intensity difference or equal proportion.

In another preferred embodiment, the human-factor lamp of this disclosure is further elaborated. In FIGS. 1, 2, 3 and 4, FIG. 4 shows a functional block diagram of a human-factor lamp capable of intelligently adjusting ambient light in accordance with a preferred embodiment of this disclosure, and the human-factor lamp has a plurality of light emitting devices 1. Unlike the conventional central control method, the human-factor lamp of this disclosure provides the functions of "eye", "ear", "mouth" and "brain" to each light emitting devices 1, and the light emitting devices 1 observes whether or not there are people below through the "eye", and when there is a person around, the "mouth" will broadcast the observation to the other light emitting devices 1; and when there are no person around, the "ear" will hear the broadcast from other light emitting devices 1 telling the information that there are people around such light emitting device 1, and finally each of the light emitting devices 1 uses its "brain" to determine its own luminous intensity performance based on the observation result of having people around, or no people around, or the mutual relationship of the corresponding light emitting devices with no people around and those with people around. In the human-factor lamp in accordance with a preferred embodiment of this disclosure, each of the light emitting devices 1 has a control processor 10, and a dimming unit 11, an identification unit 12, a detection unit 13, a transmitting unit 14, a receiving unit 15 which are electrically connected to the control processor 10, wherein the identification unit 12 stores an identity code 120 and a relationship list 121, and the identity code 120 is used for the serial number identification of the light emitting device 1, and the relationship list 121 stores the identity codes 120 of all light emitting devices 1, and sets a hierarchical relationship between each of the light emitting devices 1 and the other light emitting devices 1. Wherein, the control processor 10, the identification unit 12 and the dimming unit 11 are a part of the "brain" which is specifically formed by electronic components such as a processor, an IC component, a logic circuit, a memory, etc. and the detection unit 13 has a function similar to the "eye" which is specifically implemented by using an infrared thermal sensor or a microwave sensor; the transmitting unit 14 has a function similar to the "mouth" which is specifically implemented by using a wireless technology such as the transmission function of a Bluetooth component used for implementing a single-stage or a continual multi-stage broadcast; the receiving unit 15 has a function similar to the "ear" which is specifically implemented by a wireless technology to provide the receiving function of the Bluetooth component. Therefore, each light emitting device 1 has the property of human factors in lighting and achieves the automatic lighting adjustment effect.

Further, when the detection unit 13 one of the light emitting devices 1 detects that there is a person below, the detection unit 13 will notify the control processor 10 to drive the dimming unit 11 to perform a priority lighting value setting, and the detection unit 13 will notify the control processor 10 to drive the transmitting unit 14 to perform a luminous broadcast to the light emitting devices 1 with the identity code 120 other than the identity code 120 of the light emitting devices 1 detected that there is a person below in the relationship list 121. On the other hand, when the detection unit 13 of one of the light emitting device 1 detects that there are no person below, the receiving unit 15 will receive at least one the luminous broadcast from a light emitting devices 1 with the identity code 120 other than the identity code 120 of the light emitting device 1 detected that there is no person below, and the receiving unit 15 will notify the control processor 10 to drive the dimming unit 11 to perform a secondary lighting value setting according to the luminous broadcast; wherein a parameter of the secondary luminous value setting is determined according to the hierarchical relationship of the relationship list 121, and if the receiving unit 15 simultaneously receives two or more luminous broadcasts, the secondary luminous value will set the parameter according to the top-priority hierarchical relationship in the relationship list 121. In this way, each of the light emitting devices 1 determines whether there is person around to determine the priority lighting value setting; when the detection shows no person around, each light emitting device 1 observes other light emitting devices 1 to further determine the secondary luminous value setting. For example, the distance of two adjacent light emitting devices 1 is used as a basis for the hierarchical relationship, wherein the shorter the distance, the higher priority the mechanism. If a certain a light emitting device 1 detects that there are no person below, but there is a person at a nearer light emitting device 1, then the light emitting device 1 with no person below will set the secondary luminous value setting to A, and if there is a person below the farther light emitting device, then the light emitting device 1 with no person below will set the secondary luminous value setting to B. Since the light emitting device 1 can only be set to the secondary luminous value setting for the lighting in reality, therefore the A of the nearer light emitting device 1 is used as the basis for setting the lighting. This technical measure does not have any central control system, and each light emitting device 1 observes the position of people and their moving situation, and then uses an interactive relationship between the light emitting devices to pre-set the automatic lighting adjustment conditions. Therefore, this disclosure can lower the overall setup cost, simplify the installation construction, and facilitates the adjustment of lighting, and the property of the human-factor lamp can meet the effective application requirement of an environment and save unnecessary energy consumption.

This embodiment does not adjust all light emitting devices by means of the central control, but uses the pre-set relationship between the light emitting devices to detect people as the priority trigger mechanism. If one of the light emitting devices does not detect that there is a person around, then the pre-set relationship between such light emitting device and the light emitting device having the person around is used to determine the lighting conditions of such light emitting device. This pre-set relationship exists in various indoor environments. Preferably, the hierarchical relationship of the relationship list 121 is set according to the installation distance. In this way, the overall distribution can be set according to the appropriate spacing distance based on the effective irradiation range of light. For example, the height of the ceiling and the size of the space in different environments have different distribution configurations. To facilitate listing all light emitting devices 1 in the relationship list 121, the identity code 120 corresponding to one of the light emitting devices 1 can use the X-Y two-dimensional coordinate value for the serial number identification. In this way, when the hierarchical relationship of the relationship list 121 is set according to the installation distance, the X-Y two-dimensional coordinate value can intuitively reflects the distance relationship between two adjacent light emitting devices 1.

Based on user requirements and site conditions such as the quantity and size of equipment, the wall reflection conditions, and related factors, an appropriate adjustment can be made according to the following suggestions if the adjustment has a tendency of decreasing the brightness with increased distance. For example, the brightness of the light emitting device can be decremented sequentially from the strongest 100% by equal intensity difference or reduced proportion. Further, a lamp having the light emitting devices with the intensity ratio of 100%; 70%; 50%; 20%, and arranged with a 10*10 matrix is used as an example. With reference to FIGS. 5-9 for the schematic views showing the overall operation of various human-factor lamps in accordance with a preferred embodiment of this disclosure, the lighting setting parameters of all light emitting devices 1 can be preferably divided into a plurality of lighting conditions according to the installation distance relationship, wherein the hierarchical relationship of the relationship list 121 has a first close relationship, a second close relationship, and a third close relationship. Therefore, each light emitting device 1 installed in an environment in accordance with this embodiment can use four lighting mode to form the indoor ambient light at the site. Preferably, when at least one the light emitting device 1 is set to the priority lighting value setting, the lighting performance is driven by 100% of the rated luminous intensity of the light emitting device 1; when at least one other light emitting device 1 sets the secondary luminous value setting to a first close relationship, the lighting performance is driven by 70% or 75% of the rated luminous intensity of the light emitting device 1; when at least one other light emitting device 1 sets the secondary luminous value setting to a second close relationship, the lighting performance is driven by 50% of the rated luminous intensity of the light emitting device 1; when at least one other light emitting device 1 sets the secondary luminous value setting to a third close relationship, the lighting performance is driven by 20% or 25% of the rated luminous intensity of the light emitting device 1. From these operations, we can see that when there are people in the environment, the best lighting performance can be presented in the position of people, the discomfort and psychological pressure of the too-dark area will not be produced for the environment at a distance.

Figure 10:
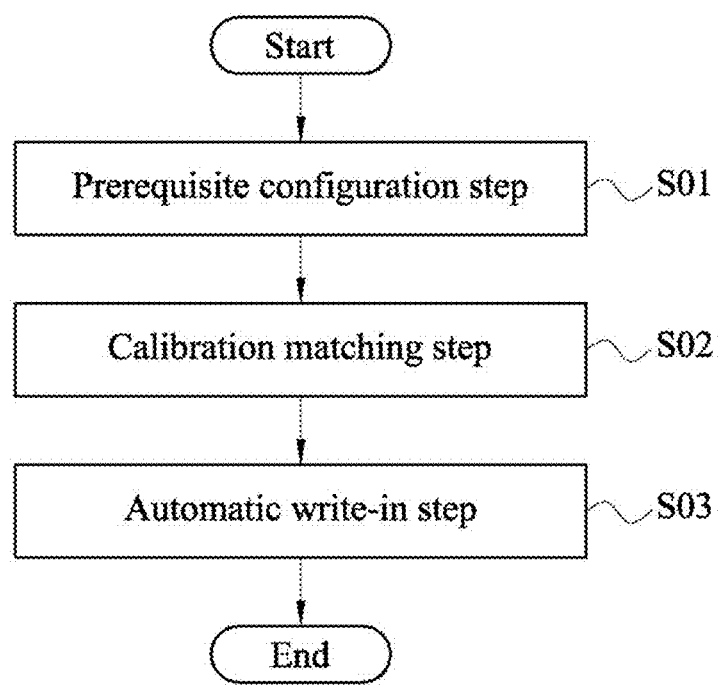
FIG. 10 is a flow chart of an initialization method of human-factor lamps capable of intelligently adjusting ambient light in accordance with a preferred embodiment of the present disclosure.

With reference to FIG. 10 for the flow chart of an initialization method in accordance with a preferred embodiment of the present disclosure, the core concept of the method is to use the indoor positioning function to create an indoor map and match the indoor map with pre-set identity code information and then automatically write the information into each light emitting device. The method includes the following three steps: In a "prerequisite configuration step S01", the human-factor lamps are installed in a factory 2 such as a plant, a warehouse, a parking lot, an office, an airport or station, and light emitting devices are installed to provide lighting to a large-space environment, and the factory 2 has a plurality of Beacon host systems 3, and the light emitting devices 1 have the Bluetooth transmission function. A specialist can perform an initialization of the human-factor lamps by a mobile phone with the Bluetooth transmission function such as a smartphone, wherein the mobile phone is loaded with a pre-set factory lighting chart information, and the factory lighting chart information includes the pre-set identity codes information corresponding to the light emitting devices. In a "calibration matching step S02", the specialist moves in the factory 2 and then stands at a real location, wherein the real location can be a position disposed in the factory and under any light emitting device. At this time, the specialist can access the factory lighting chart information by the mobile phone and set a virtual location corresponding to the real location in the factory lighting chart information as a reference location, and correct the factory lighting chart information according to the reference location to obtain the actual space configuration matching of the factory 2. In an "automatic write-in step S03", the specialist uses the indoor positioning function of the Beacon host systems 3 such as the AoA/AoD technique. The mobile phone is held at a predetermined height, and then the indoor positioning function is used to sequentially move to the corresponding positions of the light emitting devices 1, and the mobile phone will automatically and sequentially write in the identity codes corresponding to the light emitting devices 1. Wherein, the identity code corresponding to each light emitting device 1 is a serial number identification based on an X-Y two-dimensional coordinate value, and after the mobile phone automatically and sequentially writes in the identity codes corresponding to the light emitting devices 1, the light emitting devices 1 will show a luminous change such as a blinking state which is provided as a basis for the specialist to visually and directly determine whether the configuration of the light emitting devices 1 is completed, and after the specialist has moved to all corresponding positions of the light emitting devices 1, the initialization of the light emitting devices 1 is completed.

In summation of the description above, the human-factor lamps and system of the present disclosure provided for adjusting the ambient light intelligently can reduce installation costs and provide a convenient installation, and the adjusted lamps will not cause visual conflict or discomfort to human eyes. Especially for the application where lighting must be maintained 24 hours a day, this disclosure can further achieve the energy saving effect and eliminate the psychological pressure such as panic caused by a too-large area in human visual experience, and the initialization method of this disclosure can carry out the installation procedure more convenient and correctly. After the initialization of each light emitting device, the light emitting devices have different identities, so that the installation procedure of the conventional "setting up first and then installing later" method is complicated and difficult. Therefore, the initialization method of the present disclosure replaces the "setting up first and then installing later" method by the "installing first and then setting up later" method to improve the installation efficiency and avoid the wrong position configuration derived from the installation by the conventional method.

What is claimed is:

1. An initialization method of human-factor lamps capable of intelligently adjusting ambient light, wherein the human-factor lamps comprise a plurality of light emitting devices, and each of the light emitting devices comprises a control processor, and a dimming unit, an identification unit, a detection unit, a transmitting unit, and a receiving unit are electrically coupled to the control processor respectively, and the identification unit stores an identity code and a relationship list, and the identity code serves as a serial number identification of the light emitting device, and the relationship list stores the identity codes of all light emitting devices and pre-sets a hierarchical relationship between each light emitting device and the light emitting devices other than itself; if the detection unit of one of the light emitting devices detects that there is a person below, the detection unit will notify the control processor to drive the dimming unit to perform a priority lighting value setting, and the detection unit will notify the control processor to drive the transmitting unit to perform a luminous broadcast to the light emitting devices with the identity code other than the identity code of the lighting emitting device detected that there is a person below in the relationship list; if the detection unit of one of the light emitting devices detects that there is no person below, the receiving unit will receive at least one of the luminous broadcast of the light emitting devices with the identity code other than the identity code of the light emitting device detected that there is no person below, and the receiving unit will notify the control processor to drive the dimming unit to perform a secondary lighting value setting according to the luminous broadcast; wherein a parameter of the secondary lighting value setting is determined according to the hierarchical relationship in the relationship list, and if the receiving unit simultaneously receives two or more luminous broadcasts, the secondary lighting value setting will set the parameter according to the top-priority hierarchical relationship in the relationship list, and the initialization method comprising:

installing the human-factor lamps in a factory, wherein a plurality of Beacon host systems is arranged in the factory, and the light emitting devices have a Bluetooth transmission function, performing an initialization of the human-factor lamps through a mobile phone with the Bluetooth transmission function, wherein the mobile phone has pre-loaded factory lighting chart information, and the factory lighting chart information includes information of the pre-set identity codes corresponding to the light emitting devices, if a user moves in the factory and then stands at a real location, turning on the mobile phone to access the factory lighting chart information and setting a virtual location corresponding to the real location as a reference location, correcting the factory lighting chart information matched with the factory according to the reference location, and using an indoor positioning function of the Beacon host systems to move to the corresponding positions of the light emitting devices sequentially, and writing in the identity codes corresponding to the light emitting devices automatically and sequentially.

2. The initialization method of claim 1, wherein the Beacon host systems use an AoA/AoD technique to realize an indoor positioning function.

3. The initialization method of claim 2, wherein the identity code corresponding to each light emitting device uses an X-Y two-dimensional coordinate value as the serial number identification.

4. The initialization method of claim 3, wherein after writing in the identity codes corresponding to the light emitting devices automatically and sequentially, the method further comprises:

showing a luminous change by the light emitting devices.

5. The initialization method of claim 4, wherein the luminous change refers to a blinking state.

\* \* \* \* \*